(12) United States Patent
Wegner et al.

(10) Patent No.: US 9,252,425 B2
(45) Date of Patent: Feb. 2, 2016

(54) POLYACRYLONITRILE-SULPHUR COMPOSITE MATERIAL

(75) Inventors: Marcus Wegner, Leonberg (DE); Jens Grimminger, Leonberg (DE); Martin Tenzer, Unterensingen (DE); Jens Fanous, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 318 days.

(21) Appl. No.: 14/115,248

(22) PCT Filed: Mar. 7, 2012

(86) PCT No.: PCT/EP2012/053855
§ 371 (c)(1),
(2), (4) Date: Jan. 21, 2014

(87) PCT Pub. No.: WO2012/150061
PCT Pub. Date: Nov. 8, 2012

(65) Prior Publication Data
US 2014/0127589 A1    May 8, 2014

(30) Foreign Application Priority Data
Mar. 2, 2011   (DE) .................. 10 2011 075 056

(51) Int. Cl.
| | |
|---|---|
| *H01M 4/13* | (2010.01) |
| *H01M 6/16* | (2006.01) |
| *C08C 19/20* | (2006.01) |
| *H01M 4/36* | (2006.01) |
| *C08F 8/34* | (2006.01) |
| *H01M 4/1399* | (2010.01) |

(Continued)

(52) U.S. Cl.
CPC .............. *H01M 4/364* (2013.01); *C08F 8/34* (2013.01); *H01M 4/049* (2013.01); *H01M 4/137* (2013.01); *H01M 4/1399* (2013.01); *H01M 4/604* (2013.01); *H01M 10/3954* (2013.01); *H01M 4/382* (2013.01); *Y02E 60/122* (2013.01)

(58) Field of Classification Search
CPC ... H01M 4/364; H01M 4/137; H01M 4/0404; H01M 4/625; H01M 4/1399
USPC .......... 429/332, 213, 335, 337, 338, 341, 342; 525/354
See application file for complete search history.

(56) References Cited

FOREIGN PATENT DOCUMENTS

CN   101764258   6/2010

OTHER PUBLICATIONS

Wang J. et al. "Sulfur Composite Cathode Materials for Rechargeable Lithium Batteries," Advanced Functional Materials, vol. 13, No. 6, pp. 487-492, 06-0t-2003.*

(Continued)

*Primary Examiner* — William Cheung
(74) *Attorney, Agent, or Firm* — KENYON & KENYON LLP

(57) ABSTRACT

The invention relates to a method for preparing a polyacrylonitrile-sulfur composite material, in which, polyacrylonitrile is converted to cyclized polyacrylonitrile, and the cyclized polyacrylonitrile is reacted with sulfur to form a polyacrylonitrile-sulfur composite material. By a separation of the preparation method into two partial reactions, the reaction conditions are advantageously able to be optimized for the respective reactions and a cathode material is able to be provided for alkali-sulfur cells with improved electrochemical properties. In addition, the invention relates to a polyacrylonitrile-sulfur composite material, a cathode material, an alkali-sulfur cell or an alkali-sulfur battery as well as to an energy store.

41 Claims, 5 Drawing Sheets

(51) Int. Cl.
*H01M 4/04* (2006.01)
*H01M 4/137* (2010.01)
*H01M 4/60* (2006.01)
*H01M 10/39* (2006.01)
*H01M 4/38* (2006.01)

(56) References Cited

OTHER PUBLICATIONS

Yu X-G et al. "Lithium Storage in Conductive Sulfur-Containing Polymers," Journal of Eiectroanalytical Chemistry and Interfacialelectro Chemistry, vol. 573, No. 1, pp. 122, 124, Nov. 15, 2004.*

International Search Report, PCT International Application No. PCT/EP2012/053855, dated Apr. 26, 2012.

Wang J. et al. "Sulfur Composite Cathode Materials for Rechargeable Lithium Batteries," Advanced Functional Materials, vol. 13, No. 6, pp. 487-492, Jun. 1, 2003.

Yu X-G et al. "Lithium Storage in Conductive Sulfur-Containing Polymers," Journal of Electroanalytical Chemistry and Interfacialelectro Chemistry, vol. 573, No. 1, pp. 122, 124, Nov. 15, 2004.

* cited by examiner

POLYACRYLONITRILE-SULPHUR COMPOSITE MATERIAL

The present application is the national stage entry of International Patent Application No. PCT/EP2012/053855, filed on Mar. 7, 2012, which claims priority to Germany Patent Application No. DE 10 2011 075 058.8, filed on Mar. 2, 2011, the entire contents of both applications being incorporated herein by reference.

FIELD OF THE INVENTION

The present invention relates to a polyacrylonitrile-sulfur composite material, a cathode material, an alkali-sulfur cell or an alkali-sulfur battery, and an energy store, and to a method a method for preparing the same.

BACKGROUND

Production of batteries with high energy density in lithium-sulfur battery technology (Li/S) is being researched. If the cathode of a lithium-sulfur cell consisted completely of elemental sulfur, in theory, an energy content of more than 1,000 Wh/kg could be achieved. However, sulfur is neither ionically nor electrically conductive, so that additives have to be added to the cathode which clearly lower the theoretical value. In addition, during the discharge of a lithium-sulfur cell, elemental sulfur is usually reduced to soluble polysulfides $S_x^{2-}$. These are able to diffuse into regions such as the anode region, in which they are no longer able to participate in the electrochemical reaction of the subsequent charge/discharge cycles. In addition, polysulfides may be dissolved in the electrolyte which are not able to be reduced further. Therefore, in practice at this time, sulfur utilization, and, with that, the energy density of lithium-sulfur cells is clearly lower than the theoretical value, and is estimated to be between 400 Wh/kg and 600 Wh/kg.

Various concepts exist for raising the sulfur utilization. Nazar et al., Nature Materials, vol. 8, June 2009, 500-506, describe that carbon tubules favor retention of polysulfides in the cathode space and at the same time take care of sufficient conductivity.

Wang et al., Advanced Materials, 14, 2002, No. 13-14, pp. 963-965, and Advanced Functional Materials, 13, 2003, No. 6, pp. 487-492, and Yu et al., Journal of Electroanalytical Chemistry, 573, 2004, 121-128 and Journal of Power Sources, 146, 2005, 335-339, describe another technology in which polyacrylonitrile (PAN) is heated with an excess of elemental sulfur, the sulfur, on the one hand, being cyclized to form a polymer having a conjugated n-system while forming $H_2S$ polyacrylonitrile, and on the other hand, being bonded in the cyclized matrix.

SUMMARY

Example embodiments of the present invention relate to a method for producing a polyacrylonitrile-sulfur composite material, including the method steps of (a) converting polyacrylonitrile to cyclized polyacrylonitrile, and (b) converting the cyclized polyacrylonitrile with sulfur to form a polyacrylonitrile-sulfur composite material.

In step (a), first an electrically conductive base in the form of the electrically conductive, cyclized polyacrylonitrile (cPAN) is formed. In step (b), the reaction with the electrochemically active sulfur takes place, in particular, the latter being bonded covalently to the electrically conductive skeleton of cyclized polyacrylonitrile, while there is formation of polyacrylonitrile-sulfur composite material (ScPAN).

By separation into two partial reactions, the reaction conditions may advantageously be optimized to the respective reaction. Method step (a), in this context, is similar to a dehydrogenation reaction known from the preparation of carbon fiber, and second method step (b) is similar to a reaction from an additional technical field that is quite different, namely the vulcanization reaction of rubber.

The method according to the present invention has the advantage that it makes possible the preparation of a polyacrylonitrile-sulfur composite material having a defined structure. The polyacrylonitrile-sulfur composite material, that is able to be prepared by the method according to the present invention, is able to be used particularly advantageously for alkali-sulfur cells, especially lithium-sulfur cells. In this context, cathodes or rather alkali-sulfur cells, particularly lithium-sulfur cells, which include the polyacrylonitrile-sulfur composite material prepared according to the present invention, are able to demonstrate improved electrochemical properties advantageously compared to known polyacrylonitrile-sulfur composite materials. In particular, in this manner, one is able to achieve long time stability and electrochemical cycle stability, in particular, in which a large part of the active material is able to be used over a long time period.

According to an example embodiment, method step (a) takes place in an oxygen-containing atmosphere, for example, an air atmosphere or an oxygen atmosphere. An oxygen-containing atmosphere has a particularly advantageous effect on the formation of cyclized polyacrylonitrile.

According to an example embodiment, method step (a) takes place at temperature in the range of ≥150° C. to ≤500° C., especially of ≥150° C. to ≤330° C. or ≤300° C. or ≤280° C., for example of ≥230° C. to ≤270° C. These temperatures have proven suitable for the synthesis of cyclized polyacrylonitrile.

The reaction time in method step (a) may advantageously amount to less than 3 h, particularly less than 2 h, for example, less than 1 h.

If necessary, first method step (a) may take place in the presence of a cyclizing catalyst. Catalysts known from carbon fiber preparation may be used, for example, as cyclizing catalysts. The reaction temperature and/or the reaction time in method step (a) are advantageously able to be reduced by the addition of a cyclizing catalyst.

According to an example embodiment, in method step (a), the reaction mixture is preferably mixed from time to time or continuously. This also has an advantageous effect on the conversion of polyacrylonitrile to cyclized polyacrylonitrile.

According to an example embodiment, in method step (b) elemental sulfur is used, for instance, sublimed elemental sulfur. Elemental sulfur, particularly sublimed elemental sulfur, is advantageously cost-effective and comparatively simple to handle. Basically it is, however, also possible to perform method step (b) with sulfur compounds, especially those that react with the cyclized polyacrylonitrile while developing a covalent sulfur-carbon bond.

In particular, in method step (b) the sulfur may be used in excess.

According to an example embodiment, in method step (b) the weight ratio of sulfur to cyclized polyacrylonitrile may amount to ≥1:1, particularly ≥1.5:1, for example ≥2:1, for example ≥3:1, and/or ≤20:1, particularly ≤15:1 or ≤10:1, for example ≤5:1 or ≤3:1 or ≤2.5:1 or ≤2:1. These quantitative ratios have proven suitable for carrying out the method according to the present invention.

According to an example embodiment, method step (b) takes place in an inert gas atmosphere, for example, an argon atmosphere or a nitrogen atmosphere. An inert gas atmosphere has a particularly advantageous effect on the reaction of the cyclized polyacrylonitrile with sulfur, to form the polyacrylonitrile-sulfur composite material.

According to example embodiments, method step (b) takes place at a temperature in the range of ≥150° C. to ≤500° C., particularly of ≥150° C. to ≤400° C. or ≥380° C. or ≤360° C., for example, of ≥180° C. to ≤350° C. or to ≤330° C.

According to an example embodiment, the reaction time of method step (b) is less than 8 h, for example 1 h to 7 h, for example, less than 3 h.

According to an example embodiment, method step (b) is at least intermittently carried out in the presence of a vulcanization catalyst or a vulcanization accelerator and/or a vulcanization inhibitor.

In addition to the ability for the reaction temperature and/or the reaction time in method step (b) to be advantageously reduced by the addition of a vulcanization catalyst, the chain length of the polysulfides that are covalently bonded to the cyclized polyacrylonitrile may also consequently be increased by the lowering of the reaction temperature. The reason for this is that elemental sulfur is present at room temperature in the form of $S_{8\ rings}$. At temperatures above room temperature, the sulfur is present in the form of $S_x$ chains of medium chain length, for instance, from 6 to 26 sulfur atoms, or greater chain length, such as $10^3$ to $10^6$ sulfur atoms. Above 187° C., a thermal cracking process starts, and the chain length comes down again. Beginning at 444.6° C. (the boiling point), gaseous sulfur is present at a chain length of 1-8 atoms. The use of a vulcanization catalyst has the advantage, in this instance, that, at a lower temperature, longer intermolecular and/or intramolecular cross-links bonded covalently to the cyclized polyacrylonitrile are able to be introduced into the polyacrylonitrile-sulfur composite material. Thus, in turn, a higher sulfur content may advantageously be achieved in the polyacrylonitrile-sulfur composite material. To be sure, this may lead to a reduction in the cycle stability, which may be compensated for, however, by the selection of a suitable electrolyte.

For the catalysis or the vulcanization acceleration, particularly at least one sulfidic radical starter, such as a sulfenamide, for instance, a 2-mercaptobenzothiazoylamine derivative or a sulfidic metal complex, obtainable, for instance, by the reaction of zinc oxide (ZnO) and tetramethylthiuram disulfide, may be added.

In an example embodiment, in order to reduce the reaction speed or to end a reaction phase having an increased reaction speed caused, for instance, by a vulcanization catalyst or a vulcanization accelerator, at least one vulcanization inhibitor may be added.

Because of using, and the duration of using vulcanization catalysts, or vulcanization accelerators and/or vulcanization inhibitors, the properties of the polyacrylonitrile-sulfur composite materials are able to be set specifically. Vulcanization catalysts and vulcanization accelerators and/or vulcanization inhibitors that are suitable for this purpose are known from the technical field of rubber vulcanization. N-(cyclohexylthio)phthalamide may be used as a vulcanization inhibitor, for example.

According to an example embodiment, the method furthermore includes method step (c) of removing, for instance extracting, excess or unbound sulfur.

In the use of the polyacrylonitrile-sulfur composite material as a cathode material of an alkali-sulfur cell, unbound, or rather elemental sulfur may react with many electrolyte systems in the reduction, which is why the choice of electrolyte systems is restricted if unbound or elemental sulfur is present. By removing excess or unbound sulfur, advantageously additional or other electrolyte systems may be used and/or properties of the alkali-sulfur cell, especially the cycle stability, may be improved.

In the same removal step or in an additional removal step, catalysts and/or inhibitors may also be partially or completely removed.

In an example embodiment, method step (c) preferably takes place using a Soxhlet extraction, particularly using a nonpolar solvent or solvent mixture, for instance, toluol.

It is also possible, however, to leave the nonconverted or excess or unbound sulfur in the reaction mixture. Thus, in the use of the reaction mixture as cathode material for an alkali-sulfur cell, particularly a lithium-sulfur cell, a higher voltage and capacitance of the cell may be advantageously achieved.

The reason is that, because of the excess or nonconverted or unbound, in particular, elemental sulfur, especially in combination with the polyacrylonitrile-sulfur composite material according to the present invention, the sulfur utilization is able to be improved. For one thing, the polyacrylonitrile-sulfur composite material makes available a conductive surface, which may be used for the reduction of the elemental sulfur. For another thing, because of the polyacrylonitrile-sulfur composite material, a migration of polysulfides created in the reduction of the elemental sulfur, into the anode region, for example, may be inhibited in that the covalently bonded sulfur of the polyacrylonitrile-sulfur composite material reacts with the polysulfides and binds them covalently. In this instance, the polysulfide anions may open sulfur cross-links in the polyacrylonitrile-sulfur composite material, in each case two polysulfide anions being created, which are bonded covalently at one end of the chain to the cyclized polyacrylonitrile skeleton. In the following reduction, such polysulfide chains may successively be built up. Since these polysulfide chains are covalently bonded to the cyclized polyacrylonitrile skeleton, they also are no longer able to be dissolved by the electrolyte. Thus, in this way, the sulfur utilization, and consequently the voltage and the capacitance are able to be raised.

A further subject matter of the present invention is a polyacrylonitrile-sulfur composite material, for instance, for use as a cathode material for an alkali-sulfur cell, particularly for a lithium-sulfur cell. The polyacrylonitrile-sulfur composite material according to example embodiments of the present invention is particularly able to be prepared by a method according to the present invention.

The sulfur atoms may be connected in the polyacrylonitrile-sulfur composite material both directly, by covalent sulfur-carbon bonds, and indirectly by one or more covalent sulfur-sulfur bonds and one or more sulfur-carbon bonds to the cyclized polyacrylonitrile skeleton. In this context, at least a part of the sulfur atoms of the polyacrylonitrile-sulfur composite material, for instance in the form of polysulfide chains, may be covalently connected to a cyclized polyacrylonitrile strand.

It has been shown that, using a method according to an example embodiment of the present invention, a polyacrylonitrile-sulfur composite material may be prepared which is able to have polysulfide chains that are covalently bonded to the polyacrylonitrile-sulfur composite material, particularly which have, for instance essentially a chain length of ≥2 or ≥3 or ≥4, for example of ≥2 or ≥3 to ≤4 sulfur atoms.

Using a method according to the present invention, for one thing a polyacrylonitrile-sulfur composite material may be prepared, which has polysulfide chains, particularly having a chain length of ≥2 or ≥3 to ≤4 sulfur atoms, which are covalently bonded on both sides intermolecularly with two cyclized polyacrylonitrile strands, especially while forming a cross-link, particularly a polysulfide cross-link between the cyclized polyacrylonitrile strands.

Using a method according to the present invention, for another thing, a polyacrylonitrile-sulfur composite material may be prepared, which has polysulfide chains, particularly having a chain length of ≥3 to ≤4, or for example ≤3 sulfur atoms, which are covalently bonded on both sides intramolecularly with a cyclized polyacrylonitrile strand, especially while forming an S-heterocycle, particularly a polysulfide cross-link between the cyclized polyacrylonitrile strands.

Such short intermolecular and intramolecular polysulfide chains have the advantage over longer polysulfide chains that a higher percentage of the sulfur atoms are bonded directly, covalently to the carbon atoms (and not indirectly via sulfur-sulfur bonds). Sulfur-carbon bonds, in turn, have the advantage that they are stable during the reduction (and are not able to be done away with like sulfur-sulfur bonds in the case of long polysulfide chains during the reduction). Thus, sulfur-carbon bonds are advantageously able to prevent the diffusing away of sulfur and an active material loss going along with that.

In addition, it has turned out that a polyacrylonitrile-sulfur composite material prepared according to example embodiments of the present invention, in contrast to the polyacrylonitrile-sulfur composite materials prepared according to Yu et al., is able to have few or essentially no thioamide unit (S=CR(NR'R''), particularly S=CR(NHR')). Because of the methods according to example embodiments of the present invention, a polyacrylonitrile-sulfur composite material may be prepared which, with reference to the total number of sulfur atoms in the polyacrylonitrile-sulfur composite material, has a proportion of sulfur atoms bonded in thioamide units of ≤25 atom-percent, particularly ≤20 atom-percent or ≤15 atom-percent, for example, ≤10 atom-percent. In thioamide units, the sulfur already has an oxidation number of −2, and in response to its use in a cathode of an alkali-sulfur cell, particularly a lithium-sulfur cell, it cannot in theory be further reduced. Consequently, the sulfur of thioamide units lowers the theoretical sulfur utilization of the cathode material. In a method according to example embodiments of the present invention, because the creation of thioamide units is able to be reduced or even prevented, the polyacrylonitrile-sulfur composite material prepared by the method advantageously has a better sulfur utilization.

A further subject matter of the present invention is a cathode material for an alkali-sulfur cell, particularly for a lithium-sulfur cell, which includes a polyacrylonitrile-sulfur composite material according to example embodiments of the present invention.

Furthermore, the cathode material may include at least one electrically conductive additive, especially selected from the group made up of soot, graphite, carbon fibers, carbon nanotubes and mixtures thereof.

In addition, the cathode material may include at least one binding agent, for instance, polyvinylidene fluoride (PVDF) and/or polytetrafluoroethylene (PTFE).

The cathode material may include, for example: ≥10 wt.-% to ≤95 wt.-%, for example 70 wt.-% to ≤85 wt.-%, of polyacrylonitrile-sulfur composite material; ≥0.1 wt.-% to ≤30 wt.-%, for example ≥5 wt.-% to ≤20 wt.-%, of electrically conductive additives; and ≥0.1 wt.-% to ≤30 wt.-%, for example ≥5 wt.-% to ≤20 wt.-%, of binding agents.

The sum of the weight-percentage values of polyacrylonitrile-sulfur composite material, electrically conductive additives and binding agents may add up to a total of 100 wt.-%, in this context.

According to an example embodiment, the cathode material may further include additional elemental sulfur. As was explained in connection with the excess or nonconverted sulfur, the voltage and the capacitance of the cell may advantageously be increased by the presence of unbound elemental sulfur.

The cathode material may include, for example: ≥10 wt.-% to ≤90 wt.-%, for example ≥10 wt.-% to ≤30 wt.-%, of polyacrylonitrile-sulfur composite material; ≥5 wt.-% to ≤60 wt.-%, for example ≥30 wt.-% to ≤60 wt.-%, of elemental sulfur; ≥0.1 wt.-% to ≤30 wt.-%, for example ≥5 wt.-% to ≤20 wt.-%, of electrically conductive additives; and ≥0.1 wt.-% to ≤30 wt.-%, for example ≥5 wt.-% to ≤20 wt.-%, of binding agents.

The sum of the weight-percentage values of polyacrylonitrile-sulfur composite material, elemental sulfur, electrically conductive additives and binding agents may add up to a total of 100 wt.-%, in this context.

The cathode material may include, particularly in the form of a cathode material slurry, for preparing a cathode, furthermore at least one solvent, such as N-methyl-2-pyrrolidone. Such a cathode material slurry may be applied, for instance by a doctor blade, to a carrier material such as an aluminum plate or foil.

The solvents of the cathode material slurry are preferably removed again after the application of the cathode material slurry and before assembly of the lithium-sulfur cell, preferably completely, particularly by a drying method.

The cathode material carrier material system may be subdivided subsequently to form several cathode material carrier material units, by stamping or cutting.

The cathode material carrier material system or the cathode material carrier material units are able to be installed with a lithium metal anode, the latter in the form of a plate or foil, to form a lithium-sulfur cell.

In this instance, an electrolyte can be added in an example embodiment. The electrolyte may include, for example, at least one electrolyte solvent and at least one conducting salt. The electrolytic solvent may for instance be selected from the group made up of carbonic acid esters, particularly cyclic or acyclic carbonates, lactones, ethers, particularly cyclic or acyclic ethers and combinations thereof. The electrolytic solvent may include diethyl carbonate (DEC), dimethyl carbonate (DMC), propylene carbonate (PC), ethylene carbonate (EC), 1,3-dioxolane (DOL), 1,2-dimethoxyethane (DME) or a combination thereof, or it may be made thereof. The conducting salt may be selected, for example, from the group made up of lithium hexafluorophosphate ($LiPF_6$), lithium bis(trifluoromethylsulfonyl)imide (LiTFSI), lithium tetrafluoroborate ($LiBF_4$), lithium trifluoromethanesulfonate ($LiCF_3SO_3$), lithium chlorate ($LiClO_4$), lithium bis(oxalato) borate (LiBOB), lithium fluoride (LiF), lithium nitrate ($LiNO_3$), lithium hexafluoroarsenate ($LiAsF_6$) and combinations thereof.

Insofar as the cathode material includes no, or little unbound or elemental sulfur, the electrolytic solvent is preferably selected from the group made up of cyclic carbonates, acyclic carbonates and combinations thereof. In this instance, lithium hexafluorophosphate ($LiPF_6$) is preferably used as the conducting salt.

Insofar as the cathode material includes unbound or elemental sulfur, particularly additional elemental sulfur, the electrolytic solvent is preferably selected from the group made up of cyclic ethers, acyclic ethers and combinations thereof. In this instance, lithium bis(trifluoromethylsulphonyl)imide (LiTFSI) is preferably used as the conducting salt.

A further subject matter of the present invention is an alkali-sulfur cell or an alkali-sulfur battery having an alkali-containing, particularly a lithium-containing anode and a cathode, the cathode including a cathode material according to the present invention.

In this context, the anode may particularly be an alkali metal anode, especially a lithium metal anode, for example, in the form of a plate or foil, made, for instance, of metallic lithium.

Furthermore, the alkali-sulfur cell is able to include an electrolyte as described above.

According to an example embodiment, the alkali-sulfur cell includes an electrolyte of at least one electrolytic solvent and at least one conducting salt.

According to one form of this example embodiment, the electrolytic solvent is selected from the group made up of cyclic carbonates, acyclic carbonates and combinations thereof, and/or conducting salt lithium hexafluorophosphate ($LiPF_6$). This form has proven to be particularly advantageous in that the cathode material contains no unbound sulfur.

Within the scope of an additional form of this example embodiment, the electrolytic solvent is selected from the group made up of cyclic ethers, acyclic ethers and combinations thereof, and/or conducting salt lithium bis(trifluoromethylsulfonyl)imide (LiTFSI). This form has proven to be particularly advantageous in that the cathode material contains no unbound sulfur.

One additional subject matter of the present invention is an energy store, particularly a mobile or stationary energy store, which includes an alkali-sulfur cell or an alkali-sulfur battery according to example embodiments of the present invention, particularly a lithium-sulfur cell or a lithium-sulfur battery. The energy store may, for instance, be an energy store for a vehicle, such as an electric or a hybrid vehicle or an electric tool or electric unit, for instance, a screwdriver or a gardening device, or an electronic unit, such as a portable computer and/or a telecommunications unit, such as a mobile phone, PDA or a high energy storage system for a home or a plant. Since the alkali-sulfur cells or alkali-sulfur batteries according to the present invention have a very high energy density, they are particularly suitable for vehicles and stationary storage systems, such as high energy storage systems for homes or plants.

Further advantages and advantageous refinements of example embodiments of the present invention are illustrated by the drawings and elucidated in the following description. It should be noted that the drawings have only a descriptive character and are not intended to limit the invention in any form.

DETAILED DESCRIPTION

Figure 1:
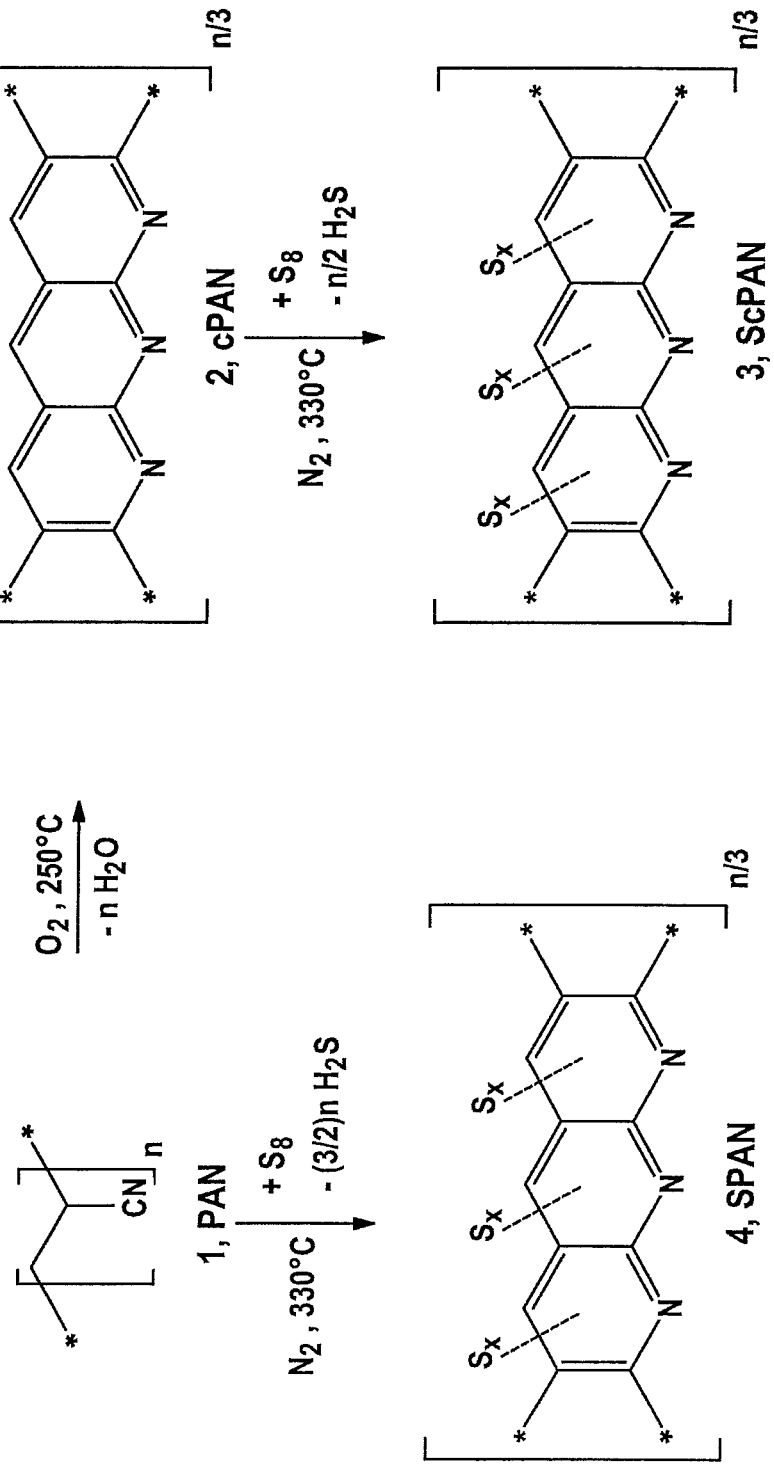
FIG. 1 shows a reaction scheme of a method according to an example embodiment of the present invention.

FIG. 1 illustrates that a method according to an example embodiment of the present invention, for preparing a polyacrylonitrile-sulfur composite material includes two partial reactions. In a first method step (a), polyacrylonitrile (PAN) 1 is converted to cyclized polyacrylonitrile 2, the cyclized polyacrylonitrile (cPAN) 2 being reacted in a second method step (b) with sulfur, to form a polyacrylonitrile-sulfur composite material (ScPAN) 3 according to an example embodiment of the present invention. Within the scope of the specific example embodiment shown in FIG. 1, in method step (a), polyacrylonitrile (PAN) is converted in an oxygen-containing atmosphere, for instance, in an air atmosphere or an oxygen atmosphere, at a synthesis temperature of about 250° C., for example while mixing through occasionally, within about one hour, while forming water and a black, powder-formed, cyclized polyacrylonitrile (cPAN) 2, and, in method step (b), a 1:3 (w/w) mixture of the cyclized polyacrylonitrile (cPAN) 2 and elemental sulfur is reacted in an inert gas-containing atmosphere at a synthesis temperature of about 3300 C within about six hours while forming hydrogen sulfide and a black polyacrylonitrile-sulfur composite material (ScPAN) 3 according to an example embodiment of the present invention.

The method according to the example embodiment of the present invention thereby differs from the single step method according to Yu et al. and Wang et al. shown in FIG. 1, in which polyacrylonitrile 1 is reacted directly with elemental sulfur in an argon atmosphere or a nitrogen atmosphere, while forming hydrogen sulfide, to form a polyacrylonitrile-sulfur composite material (SPAN) 4.

The structural chemical formulas illustrated in FIG. 1 for polyacrylonitrile-sulfur composite material (ScPAN) 3 and polyacrylonitrile-sulfur composite material (SPAN) 4 according to Yu et al. are greatly simplified. Upon detailed observation, the two polyacrylonitrile-sulfur composite materials (ScPAN) 3 and (SPAN) 4 are clearly different. In particular, one polyacrylonitrile-sulfur composite material (ScPAN) 3 has a higher proportion of sulfur atoms bonded directly covalently to carbon, as well as essentially no or a lower proportion of thioamide unit than the polyacrylonitrile-sulfur composite material (SPAN) 4 according to Yu et al. and Wang et al.

EXAMPLES

1. Polyacrylonitrile-Sulfur Composite Material Synthesis 1.1 Synthesis of a Polyacrylonitrile-Sulfur Composite Material (ScPAN) 3 According to an Example Embodiment of the Present Invention 3 g polyacrylonitrile (PAN) were heated with occasional stirring in a round flask under an air atmosphere to 250° C. for one hour. A black powder formed of cyclized polyacrylonitrile (cPAN). Elemental analysis: (C, 64.7; N, 23.2, O, 9.1; H, 3.2) and water vapor. The cyclized polyacrylonitrile (cPAN) was finely mixed with elemental sulfur at a weight ratio cPAN:S of 1:3, by grinding in a mortar or by dispersing in ethanol using a mixer marketed under the trade name Ultraturax, and subsequently removing the solvent. The mixture was then heated in a Schlenk flask under a nitrogen atmosphere to 330° C. for 6 hours.

In order to remove excess sulfur and to determine the proportion of covalently bonded sulfur, the mixture was purified for six hours in a toluol Soxhlet extraction. Subsequently, the polyacrylonitrile-sulfur composite material (ScPAN) 3 thus obtained was dried under vacuum for 24 hours at 100° C. Elemental Analyses (C, 53.0; S, 17.6; N, 18.2; O, 9.3; H, 1.7) showed that, in polyacrylonitrile-sulfur composite material (ScPAN) 3, the sulfur content was the same before and after the extraction. One may conclude from this that, in polyacrylonitrile-sulfur composite material (ScPAN) 3, the sulfur was present completely covalently bonded right from the beginning.

1.2 Comparative Test: Synthesis of a Polyacrylonitrile-Sulfur Composite Material (SPAN) 4 According to Yu et al.

The crude product of polyacrylonitrile-sulfur composite material (SPAN) 4 prepared analogously to Yu et al. at a temperature of 330° C. had a sulfur content of 48 wt.-%. In order to determine the proportion of sulfur bonded covalently and to remove excess sulfur for this, the mixture was purified in a toluol Soxhlet extraction for 6 hours. Subsequently, the polyacrylonitrile-sulfur composite material (SPAN) 4 thus obtained was dried under vacuum for 24 hours at 100° C. A sample of the purified and dried product demonstrated a content of covalently bonded sulfur of 42%, with reference to the total weight of the polyacrylonitrile-sulfur composite material (SPAN) 4. From this one may conclude that the polyacrylonitrile-sulfur composite material (SPAN) 4 contained 6% unbound elemental sulfur besides the covalently bonded sulfur.

2. Preparation of Lithium-Sulfur Cells

The polyacrylonitrile-sulfur composite materials of example 1.1 and 1.2 were processed with soot (Super PLi) and polyvinylidene fluoride (Solef 6020) at a weight percentage ratio of 70:15:15 in N-methyl-2-pyrrolidone (NMP) to form a cathode material slurry. The slurry was doctored onto an aluminum foil (Roth) (wet layer thickness 400 μm) and vacuum dried. After complete drying, a cathode was stamped out in each case, and this was inserted in a test cell opposite a foil-shaped lithium metal anode. A separator obtainable under the trade name Celgard 2400 was used as the separator. As the electrolyte, 1 mol $LiPF^6$ in ethylene carbonate (EC): diethyl carbonate (DEC):and dimethyl carbonate (DMC) in a volume ratio 2:2:1 was used. The test cells were evaluated using BaSyTec software.

3. Analysis Results

Figure 2:
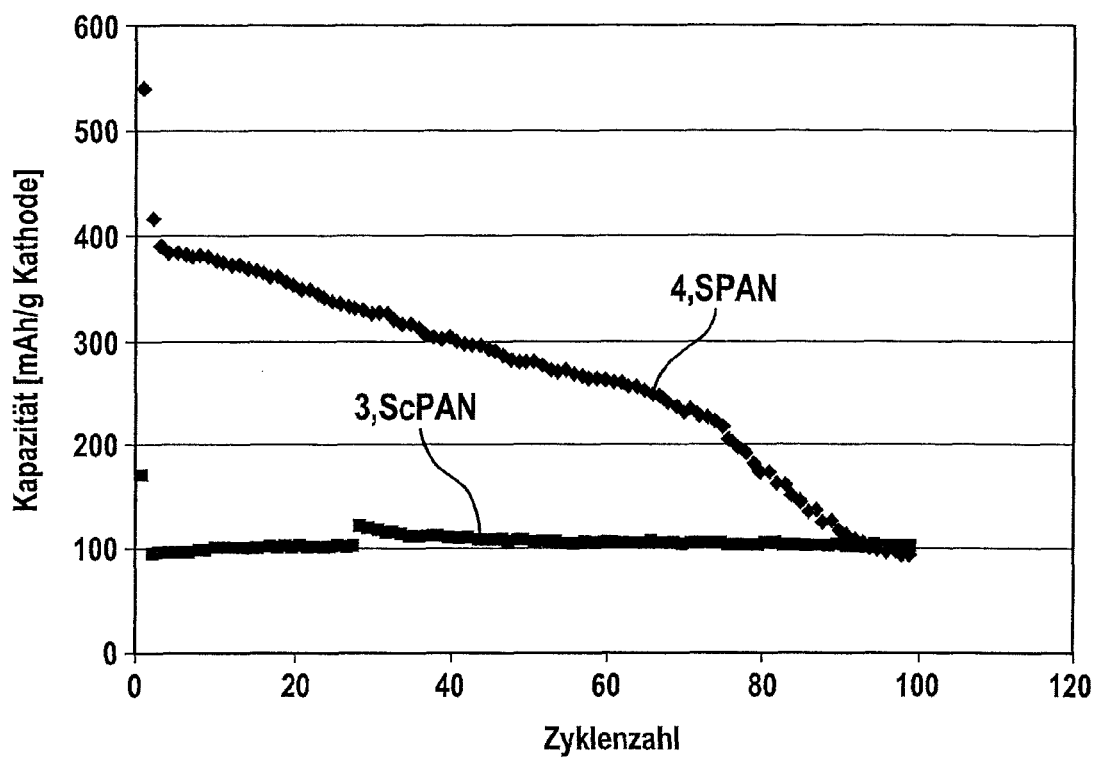
FIG. 2 is a graph in which the capacitance, with reference to the entire mass of the cathode material, of an example embodiment of a polyacrylonitrile-sulfur composite material according to example 1.1 and 1.2, is plotted against the cycle number.

FIG. 2 shows the capacitance curve with reference to the entire mass of the cathode material, of the polyacrylonitrile-sulfur composite material of example 1.1 and 1.2. FIG. 2 shows that polyacrylonitrile-sulfur composite material (ScPAN) 3 according to the present invention, purified by Soxhlet extraction, has an excellent cycle stability. FIG. 2 further shows that the polyacrylonitrile-sulfur composite material (SPAN) 4 does, to be sure, demonstrate a higher initial capacitance, but a clearly worse cycle stability, than polyacrylonitrile-sulfur composite material (ScPAN) 3 according to example embodiments of the present invention. FIG. 2 also shows that the capacitance of polyacrylonitrile-sulfur composite material (SPAN) 4, as of approximately the 95th cycle, drops below polyacrylonitrile-sulfur composite material (ScPAN) 3, which shows that, in polyacrylonitrile-sulfur composite material (SPAN) 4, not covalently bonded sulfur is contained or is formed, which, in contrast to polyacrylonitrile-sulfur composite material (ScPAN) 3, is further removed from the electrochemical reaction. The sharp drop at the initial measuring points may be interpreted to mean that, in both cases, electrochemical reactions are running which, in the continual cyclizing of the polyacrylonitrile-sulfur composite material (ScPAN) 3, according to the present invention, only occur having a clearly lower intensity.

Figure 3:
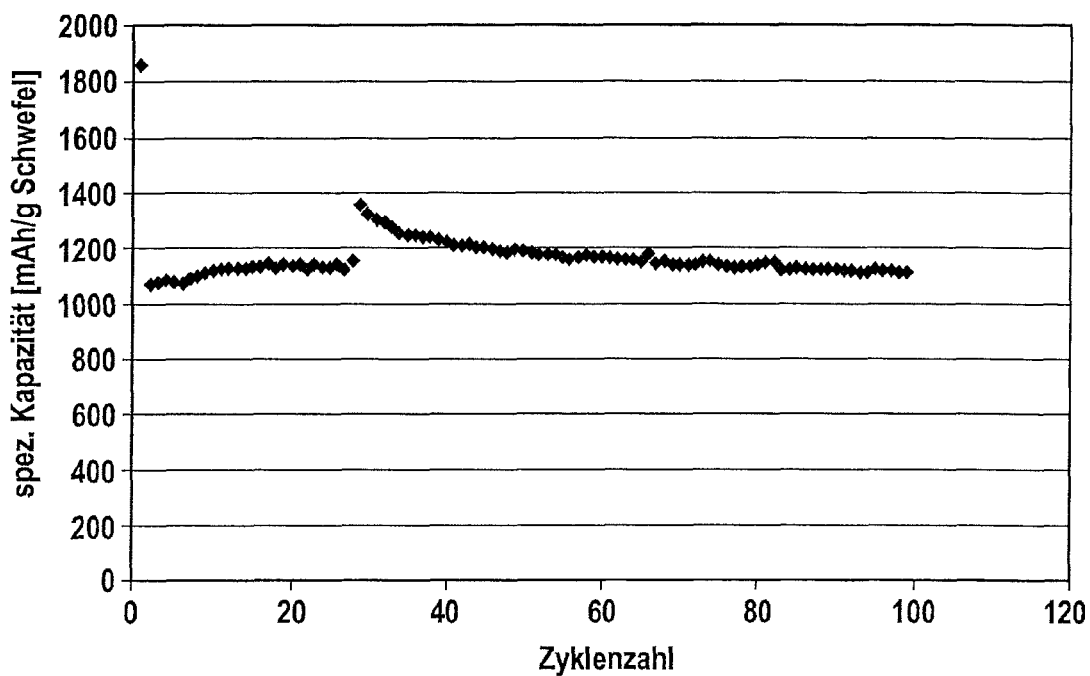
FIG. 3 is a graph in which the specific capacitance, with reference to the sulfur weight of the cathode, is plotted against the cycle number for the polyacrylonitrile-sulfur composite material according to example 1.1.

FIG. 3 shows the curve of the specific capacitance, with reference to the sulfur mass, of the polyacrylonitrile-sulfur composite material of example 1.1. FIG. 3 is based on the same measurement as FIG. 2.

The examples show clearly that a polyacrylonitrile-sulfur composite material (ScPAN) 3 is electrochemically active and has a very good cycle stability. By the optimization of the synthesis conditions, it is possible further to raise the sulfur content and thus to increase the capacitance.

In addition, ToF-SIMS spectra were taken (ToF-SIMS 5 of ION-TOF) of the products of example 1.1 and 1.2. Furthermore, XPS analyses were carried out using a PHI Quantera SXM spectrometer, using focused, monochromatized AlKα radiation (1486.6 eV) having a constant operating energy of 55 eV. The spectrometers were calibrated using the photoemission lines of Au (Au4f7/2=83.96±0.1 eV), Ag (Ag3d5/2=368.21±0.1 eV) and Cu (Cu2p3/2=932.62±0.1 eV). In the case of the Ag3d5/2-line, the half-intensity width (FWHM) under the measuring conditions amounted to 0.63 eV. The measuring range had a diameter of 100 μm. The pressure in the measuring chamber was in a range of 10-9 Torr. In addition, FT-IR spectra were taken.

Figure 4A:
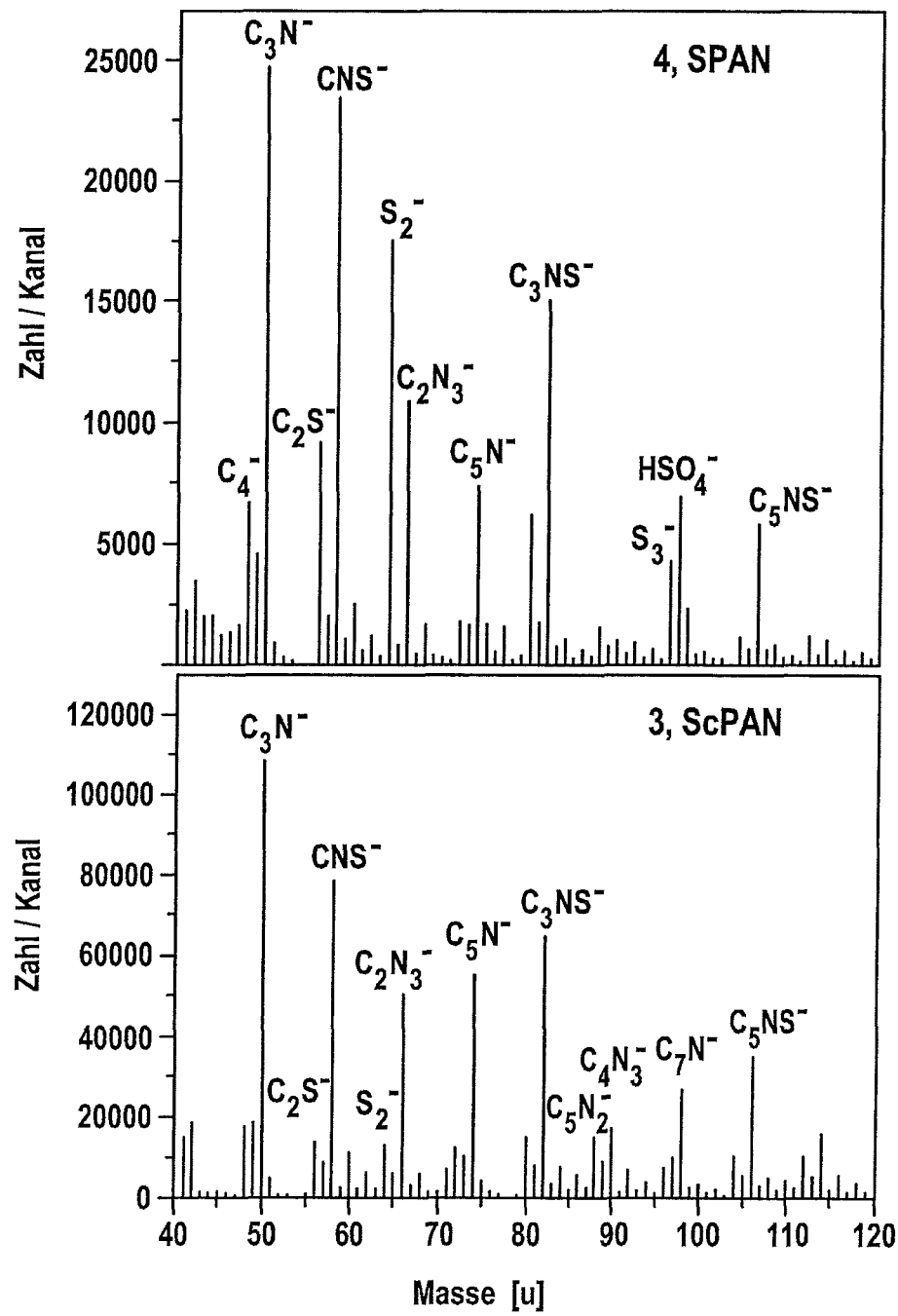
FIG. 4a shows the ToF-SIMS spectra of the polyacrylonitrile-sulfur composite material according to example 1.1 and 1.2.

FIG. 4a shows ToF-SIMS spectra of ScPAN composite material 3 according to the present invention, according to example 1.1 and of comparison composite material SPAN 4 as in example 1.2. The spectra show a clearly different fragmentation, particularly different CNS fragments, for instance, CNS— and C3NS—. Furthermore, although CS fragments (C2S—) were detected, SN fragments were not detected, using m/z=46, for example. This permits one to conclude that no sulfur-nitrogen bonds were present. The strong signal at m/z=58 may be assigned to CNS—, and shows that a large portion of the sulfur is bonded to carbon atoms which are adjacent to nitrogen atoms. Basically, there a number of possibilities as to how sulfur is able to be bonded to carbon, for instance, as intermolecular and/or intramolecular rings and chains.

Figure 4B:
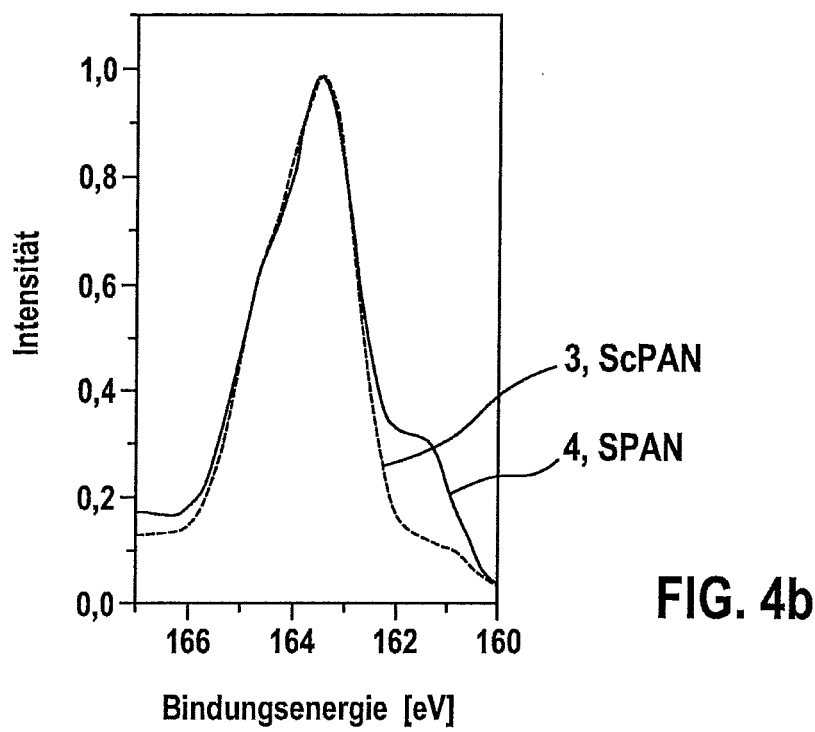
FIG. 4b shows the XPS spectra of the polyacrylonitrile-sulfur composite material according to example 1.1 and 1.2.

The XPS spectra, shown in FIG. 4b, of ScPAN composite material 3 according to the present invention according to example 1.1, and of comparison composite material SPAN 4 as in example 1.2, are also different. The signal at 163.5 eV stands for an electron of a sulfur atom bonded directly to carbon or sulfur, as in organosulfides. The shoulder at 161.5 eV in the spectrum of comparison composite material SPAN 4 according to example 1.2 does not appear in ScPAN composite material 3 according to example 1.1, and may be interpreted as pointing to sulfidic sulfur (2−).

Figure 4C:
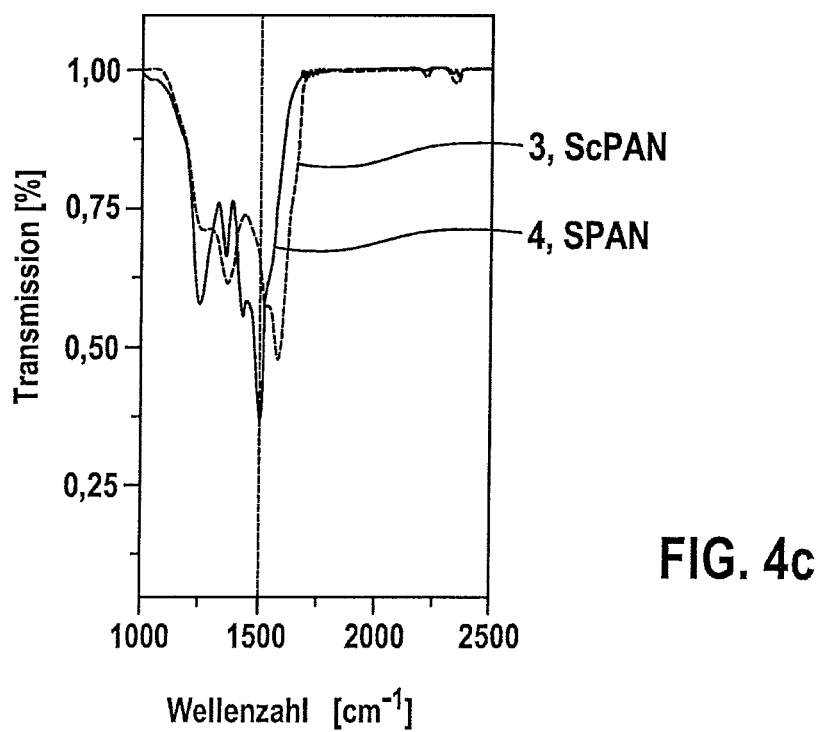
FIG. 4c shows the FT-IR spectra of the polyacrylonitrile-sulfur composite material according to example 1.1 and 1.2.

The FT-IR spectra, shown in FIG. 4c, of ScPAN composite material 3 according to the present invention according to example 1.1, and of comparison composite material SPAN 4 as in example 1.2, are also different. In the range of 2400 cm$^{-1}$ to 1800 cm$^{-1}$, the spectra are similar. At 1500 cm$^{-1}$, however, only comparison composite material SPAN 4, as in example 1.2, has a strong signal, which may be assigned to thioamide, which has sulfidic sulfur having oxidation number −2. This may be explained by the fact that in the one-step synthesis according to example 1.2, hydrogen sulfide is formed, which is able to react with the nitrile group of PAN to form a thioamide. In the multi-step synthesis according to the present invention, this reaction cannot occur, since the nitrile groups have already abreacted before sulfur is added.

Therefore, presumably a part of the CNS fragments in the ToF-SIMS of the comparison composite material SPAN 4, as in example 1.2, results from thioamides. Besides that, there are presumably further functional groups which fragment into CNS fragments. One possibility for this would be ortho-thiopyridine.

The low signal strength of S2 and S3 fragments in the spectrum of composite material ScPAN 3, according to example embodiments of the present invention, additionally points to a low polysulfide chain length of 2 to 4 sulfur atoms. In addition, there is information on six-membered rings made up of 3 carbon atoms and 3 sulfur atoms, as bonded on both sides covalently intramolecularly, forming a condensed six-membered ring polysulfide chain having 3 sulfur atoms, in composite material ScPAN 3 according to the present invention.

Figure 5:
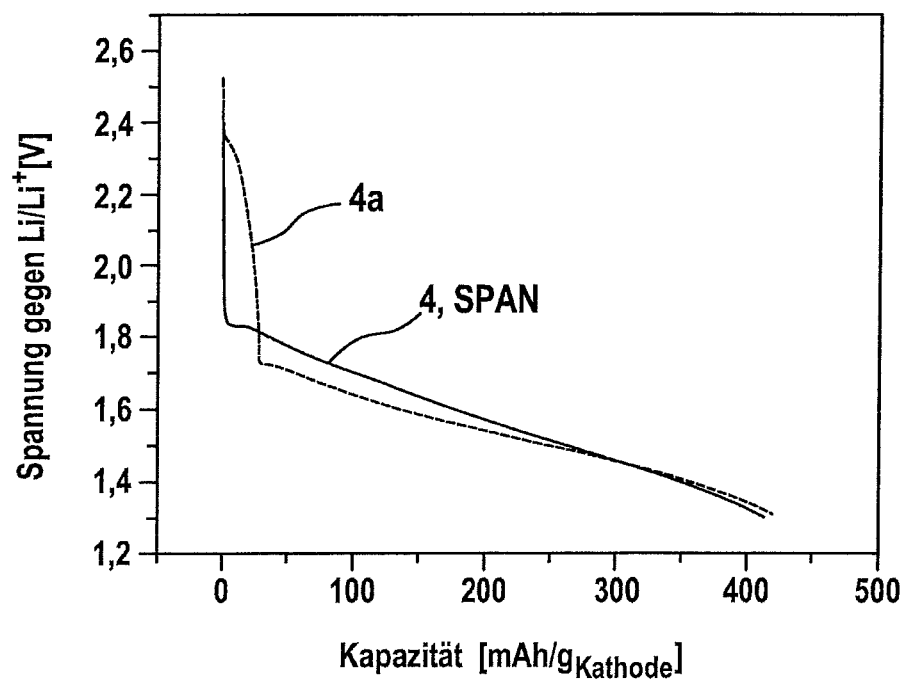
FIG. 5 is a graph in which the voltage is plotted against the capacitance, with reference to the entire mass of the cathode, for the polyacrylonitrile-sulfur composite material, according to example 1.2, before and after the toluol Soxhlet extraction.

FIG. 5 shows voltage curves of comparison composite material SPAN, as in example 1.2, before 4a and after 4 sulfur extraction (composite content 70 wt.-% opposite lithium metal anode, cycle rate C/10). The voltage curve of the comparison composite material 4a containing unpurified, elemental sulfur, during the first discharge cycle, shows a clear shoulder at the beginning, which cannot be observed in the case of purified comparison composite material SPAN 4, and which may be interpreted as a sign for the presence of elemental sulfur and a lower proportion of covalently bonded sulfur. In addition, in both cases a clear voltage drop occurs, which may be interpreted to mean that sulfur atoms, which are not bonded directly covalently to carbon, but rather to sulfur, may be reduced and removed from the reaction by diffusion.

What is claimed is:

1. A method comprising:
   in a first step (a), applying polyacrylonitrile, without adding any sulfur matter to the polyacrylonitrile, to an environment by which the polyacrylonitrile is converted to cyclized polyacrylonitrile; and
   in a second step (b) that is performed subsequent to performance of the first step (a), applying a mixture, including the cyclized polyacrylonitrile produced by the first step (a) and sulfur, to an environment by which the mixture forms a polyacrylonitrile-sulfur composite material.

2. The method of claim 1, wherein step (a) takes place in an oxygen-containing atmosphere.

3. The method of claim 1, wherein step (a) takes place at a temperature in a range of ≥150° C. to ≤500° C.

4. The method of claim 1, wherein elemental sulfur is used in step (b).

5. The method of claim 1, wherein sublimed elemental sulfur is used in step (b).

6. The method of claim 1, wherein, in step (b), the weight ratio of sulfur to cyclized polyacrylonitrile is 1:1.

7. The method of claim 1, wherein, in step (b), the weight ratio of sulfur to cyclized polyacrylonitrile is ≥1.5:1.

8. The method of claim 1, wherein, in step (b), the weight ratio of sulfur to cyclized polyacrylonitrile is ≤20:1.

9. The method of claim 1, wherein, in step (b), the weight ratio of sulfur to cyclized polyacrylonitrile is ≤15:1.

10. The method of claim 1, wherein step (b) takes place in an inert gas atmosphere.

11. The method of claim 10, wherein step (b) takes place in an argon or nitrogen atmosphere.

12. The method of claim 1, wherein step (b) is at least intermittently carried out in the presence of a vulcanization catalyst.

13. The method of claim 1, wherein step (b) is at least intermittently carried out in the presence of a vulcanization accelerator.

14. The method of claim 1, wherein step (b) is at least intermittently carried out in the presence of a vulcanization inhibitor.

15. The method of claim 1, wherein the method further comprises:
   in a third step (c), at least one of removing and extracting excess and unbonded sulfur.

16. The method of claim 1, further comprising using the polyacrylonitrile-sulfur composite material as cathode material of an alkali-sulfur cell.

17. The method of claim 1, further comprising using the polyacrylonitrile-sulfur composite material as cathode material of a lithium-sulfur cell.

18. A polyacrylonitrile-sulfur composite material, comprising:
   sulfur atoms, wherein, with respect to the total number of sulfur atoms in the polyacrylonitrile-sulfur composite material, a proportion of sulfur atoms bonded in thioamide units is ≤25 atom-percent.

19. The polyacrylonitrile-sulfur composite material of claim 18, wherein the polyacrylonitrile-sulfur composite material is arranged as cathode material of an alkali-sulfur cell.

20. The polyacrylonitrile-sulfur composite material of claim 18, wherein the polyacrylonitrile-sulfur composite material is formed by a method that includes: in a first step (a), converting polyacrylonitrile to cyclized polyacrylonitrile; and, in a second step (b), converting the cyclized polyacrylonitrile with sulfur to form a polyacrylonitrile-sulfur composite material.

21. An alkali-sulfur cell or battery, comprising:
   an alkali-containing anode;
   a cathode; and
   an electrolyte that includes at least one electrolytic solvent and at least one conducting salt;
   wherein:
      the cathode includes a polyacrylonitrile-sulfur composite material that at least one of:
         is formed by a method that includes: in a first step (a), converting polyacrylonitrile to cyclized polyacrylonitrile; and, in a second step (b), converting the cyclized polyacrylonitrile with sulfur to form a polyacrylonitrile-sulfur composite material; and
         includes polysulfide chains with a chain length of ≥2 to ≤4 sulfur atoms, which are covalently bonded on both sides intermolecularly to a cyclized polyacrylonitrile strand; and at least one of:
  the electrolytic solvent is selected from a group consisting of cyclic ethers, acyclic ethers, and combinations thereof; and
  the conducting salt is lithium bis(trifluoromethylsulphonyl)imide.

22. The alkali-sulfur cell or battery of claim 21, wherein the alkali-sulfur cell or battery is arranged as, or as a part of, an energy store of an electric vehicle, a hybrid vehicle, an electric tool, an electric unit, a screwdriver, a gardening device, a portable computer, a mobile telecommunications unit, a Personal Digital Assistant (PDA), or a high energy storage system of a building.

23. The method of claim 1, wherein the environment to which the polyacrylonitrile is applied in the first step (a) is different than the environment to which the cyclized polyacrylonitrile is applied in the second step (b).

24. The method of claim 23, wherein the environment to which the polyacrylonitrile is applied in the first step (a) is an oxygen-containing atmosphere and the environment to which the cyclized polyacrylonitrile is applied in the second step (b) is an inert gas-containing environment.

25. The method of claim 1, wherein the first step (a) is performed at a different temperature than a temperature at which the second step (b) is performed.

26. The method of claim 25, wherein the temperature to which the polyacrylonitrile is subjected in the first step (a) is approximately 250° C. and the temperature to which the cyclized polyacrylonitrile is subjected in the second step (b) is approximately 330° C.

27. The method of claim 1, wherein a duration of the first step (a) is different than a duration of the second step (b).

28. The method of claim 27, wherein the duration of the first step (a) is less than the duration of the second step (b).

29. The method of claim 28, wherein the duration of the first step (a) is approximately one hour and the duration of the second step (b) is approximately six hours.

30. The method of claim 1, wherein the first step (a) is performed used a cyclizing catalyst, and the second step (b) is performed using at least one of a vulcanization catalyst, a vulcanization accelerator, and a vulcanization inhibitor.

31. The method of claim 1, wherein the first step (a) further produces water and the second step (b) further produces hydrogen sulfide.

32. The method of claim 1, wherein the polyacrylonitrile-sulfur composite material includes polysulfide chains with a chain length of ≥2 to ≤4 sulfur atoms, which are covalently bonded on both sides intermolecularly to a cyclized polyacrylonitrile strand.

33. The method of claim 32, wherein the bonding on both sides is intermolecularly to two cyclized polyacrylonitrile strands.

34. The method of claim 32, further comprising arranging the polyacrylonitrile-sulfur composite material as cathode material of an alkali-sulfur cell.

35. The method of claim 1, wherein the polyacrylonitrile-sulfur composite material includes sulfur atoms, and, with respect to the total number of sulfur atoms in the polyacrylonitrile-sulfur composite material, a proportion of sulfur atoms bonded in thioamide units is ≤25 atom-percent.

36. The method of claim 35, further comprising arranging the polyacrylonitrile-sulfur composite material as cathode material of an alkali-sulfur cell.

37. The method of claim 1, further comprising arranging the polyacrylonitrile-sulfur composite material as a cathode of an alkali-sulfur cell or battery, wherein the alkali-sulfur cell or battery further includes an alkali-containing anode.

38. The method of claim 37, wherein the polyacrylonitrile-sulfur composite material includes polysulfide chains with a chain length of ≥2 to ≤4 sulfur atoms, which are covalently bonded on both sides intermolecularly to a cyclized polyacrylonitrile strand.

39. The method of claim 37, wherein the alkali-sulfur cell or battery includes an electrolyte that includes: (a) at least one electrolytic solvent selected from a group consisting of cyclic carbonates, acyclic carbonates, and combinations thereof; and (b) lithium hexafluorophosphate as at least one conducting salt.

40. The method of claim 37, wherein the alkali-sulfur cell or battery includes an electrolyte that includes: (a) at least one electrolytic solvent selected from a group consisting of cyclic ethers, acyclic ethers, and combinations thereof; and (b) lithium bis(trifluoromethylsulphonyl)imide as at least one conducting salt.

41. The method of claim 37, wherein the alkali-sulfur cell or battery is arranged as, or as a part of, an energy store of an electric vehicle, a hybrid vehicle, an electric tool, an electric unit, a screwdriver, a gardening device, a portable computer, a mobile telecommunications unit, a Personal Digital Assistant (PDA), or a high energy storage system of a building.

* * * * *